(12) United States Patent
Feig et al.

(10) Patent No.: US 7,865,838 B2
(45) Date of Patent: *Jan. 4, 2011

(54) ZOOM-CAPABLE SCROLLBAR

(75) Inventors: Ephraim Feig, San Diego, CA (US); Jeane Shu-Chun Chen, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 422 days.

This patent is subject to a terminal disclaimer.

(21) Appl. No.: 11/962,696

(22) Filed: Dec. 21, 2007

(65) Prior Publication Data

US 2008/0141165 A1 Jun. 12, 2008

Related U.S. Application Data

(63) Continuation of application No. 09/725,503, filed on Nov. 30, 2000, now Pat. No. 7,380,216.

(51) Int. Cl.
*G06F 3/048* (2006.01)

(52) U.S. Cl. .................. 715/786; 715/833; 715/859

(58) Field of Classification Search ......... 715/786–787, 715/833, 855, 859, 798, 799, 800, 801, 815
See application file for complete search history.

(56) References Cited

U.S. PATENT DOCUMENTS

| | | | |
|---|---|---|---|
| 5,039,937 A | 8/1991 | Mandt et al. | |
| 5,371,846 A | 12/1994 | Bates | |
| 5,452,413 A | 9/1995 | Blades | |
| 5,491,781 A | 2/1996 | Gasperina | |
| 5,513,306 A * | 4/1996 | Mills et al. | 715/853 |
| 5,553,225 A | 9/1996 | Perry | |
| 5,625,782 A | 4/1997 | Soutome et al. | |
| 5,638,523 A * | 6/1997 | Mullet et al. | 345/855 |
| 5,751,285 A | 5/1998 | Kashiwagi et al. | |
| 5,872,566 A | 2/1999 | Bates et al. | |
| 5,877,758 A | 3/1999 | Seybold | |
| 5,880,722 A | 3/1999 | Brewer et al. | |
| 6,219,050 B1 * | 4/2001 | Schaffer | 715/853 |
| 6,486,896 B1 * | 11/2002 | Ubillos | 345/784 |
| 2001/0028369 A1 * | 10/2001 | Gallo et al. | 345/848 |

OTHER PUBLICATIONS

Author Unknown, Zoomin on Visual Calendar Data, IBM Research Disclosure 32919, Sep. 1981, p. 653, IBM Corporation.
United States Patent and Trademark Office, Office Action for U.S. Appl. No. 09/725,503, filed Jul. 2, 2003, pp. 1-8, Alexandria, VA, USA.
United States Patent and Trademark Office, Office Action for U.S. Appl. No. 09/725,503, filed Jan. 13, 2004, pp. 1-8, Alexandria, VA, USA.
United States Patent and Trademark Office, Office Action for U.S. Appl. No. 09/725,503, filed Dec. 9, 2004, pp. 1-9, Alexandria, VA, USA.
United States Patent and Trademark Office, Notice of Allowance with Examiner Amendment for U.S. Appl. No. 09/725,503, filed Feb. 29, 2008, pp. 1-7, Alexandria, VA, USA.
IBM Research Disclosure 32919, Sep. 1991, p. 653 entitled "Zooming on Visual Calendar Data"; disclosed anonymously.

* cited by examiner

*Primary Examiner*—Weilun Lo
*Assistant Examiner*—Truc T Chuong
(74) *Attorney, Agent, or Firm*—Lee Law, PLLC; Christopher B. Lee

(57) ABSTRACT

A graphical user interface displays a coarse control scrollbar to provide a user with coarse resolution sequential data control and a magnified view scrollbar proximate to the coarse control scrollbar. The magnified view scrollbar provides the user with fine resolution sequential data control. When the cursor is on the scrollbar, an overlay is opened which is a zoomed version of the scrollbar. The zoom range of the overlay is adjustable and can either be preset by the user or set during the zooming operation. When operating the overlay, a menu is available which allows the user to choose between zooming up or down to select the desired position.

6 Claims, 7 Drawing Sheets

ZOOM-CAPABLE SCROLLBAR

CROSS-REFERENCE TO RELATED APPLICATION

The present application is a continuation of U.S. application Ser. No. 09/725,503, filed on Nov. 30, 2000.

FIELD OF THE INVENTION

This disclosure relates to a graphical user interface system, methods, and program product. More particularly, this disclosure relates generally to a zoom-capable scrollbar for use in a graphical user interface system, method, and program.

BACKGROUND

Scrollbars are user interface tools that allow users to navigate over data that is presented in a sequential manner. In operation, a slider of a scrollbar moves in proportion to the position in a file. For example, media players for audio or video have a scrollbar with a slider which, when it is at the left-end of the bar indicates that the player is playing the beginning of the file, when at the right-end indicates that the player is playing the end of the file, and when somewhere in between indicating that the player is playing that portion of the data which is somewhere in between as indicated by the position of the slider. The user can move the slider to access the data at desired points in the presentation. Any Graphical User Interface (GUI) that presents information in a window is capable of utilizing scrollbars, such as word processing programs, spreadsheets, databases, graphical presentation programs, audio players, and video players.

Increasingly, audio and video players are being used in a graphical user interface setting, such as in a computer or web-TV. Although such audio and video players are becoming standard with the increased use of DVD and CD technology, the resolution tuning available to such players fail to allow fine resolution sequential data control. As an example, a scrollbar in a media player may be 4 inches long and represent 2 hours of video. Manipulation of a slider to locate fine temporal positions in the video becomes very difficult for a user. Slight movement of the slider can translate to a jump of several minutes of video. Often the user desires finer control of the seek function, but such control has heretofore not been available. What is needed is a graphical user interface that displays a coarse control scrollbar to provide a user with coarse resolution sequential data control and a magnified view scrollbar to provide the user with fine resolution sequential data control.

SUMMARY

The present disclosure is drawn to a graphical user interface method that includes displaying a coarse control scrollbar in a graphical user interface to provide a user with coarse resolution sequential data control. The disclosure further includes displaying a magnified view scrollbar in the graphical user interface proximate to the coarse control scrollbar. The magnified view scrollbar provides the user with fine resolution sequential data control.

The present disclosure introduces zoom capability to the scrollbar. If a user activates the visual menu, such as by clicking on the right mouse button, while the cursor is on the scrollbar slider, an overlay is displayed. This overlay is a zoomed version of the scrollbar, which is typically centered adjacent to the position of the original scrollbar slider. The range of the new zoomed scrollbar can be determined by a preset parameter that the user can select.

Zooming can be continued in cascading fashion. When a user is already in a zoomed scrollbar mode, the user can again activate a visual menu when the cursor is on the zoomed scrollbar slider. This further activation causes a visual menu to appear which allows the user to choose between zooming up or down.

DETAILED DESCRIPTION OF THE PREFERRED EMBODIMENTS

Figure 1:
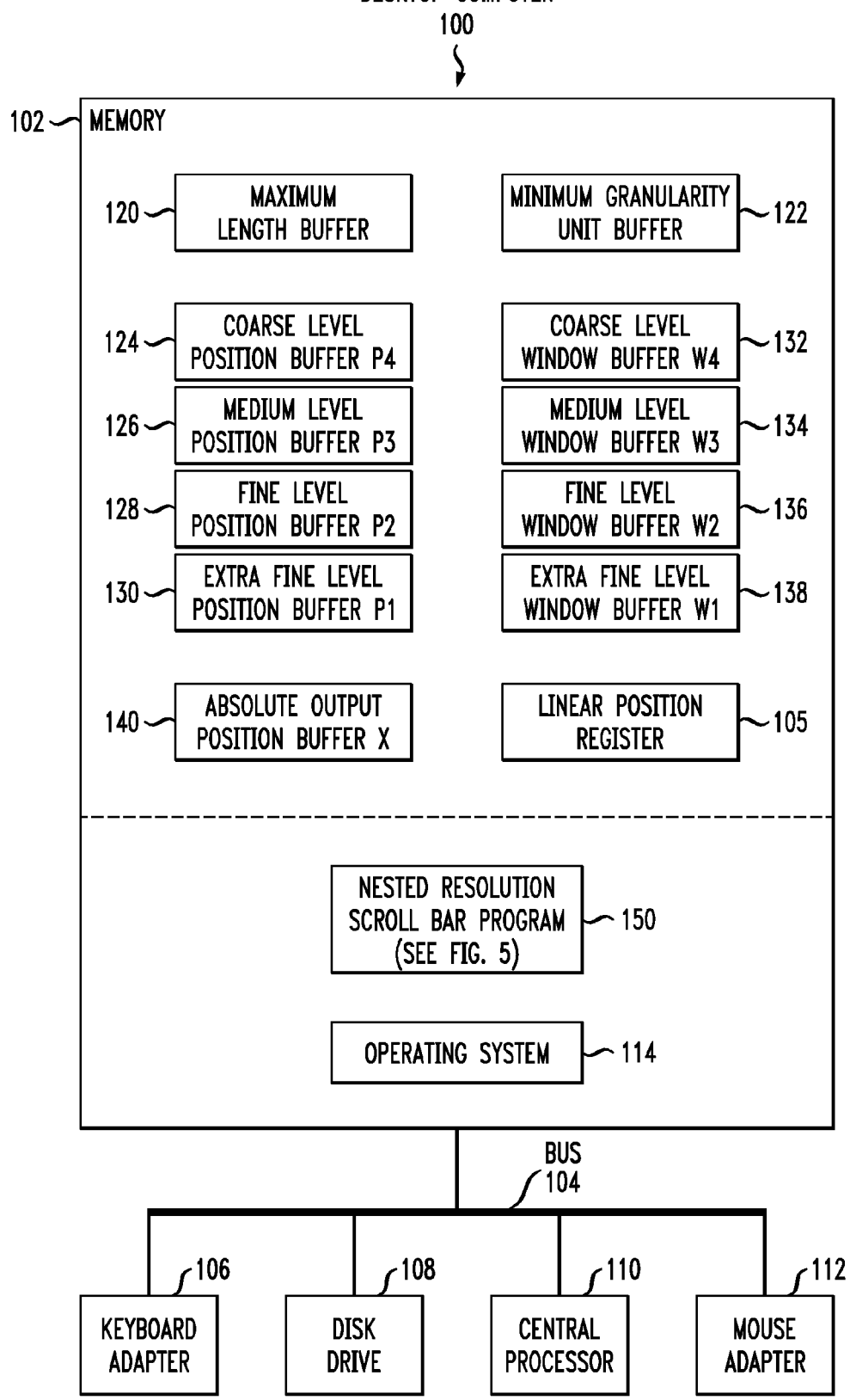
FIG. 1 is a functional block diagram of a computer that stores the program to perform a nested resolution scrollbar function.

FIG. 1 is a functional block diagram of a desktop computer 100 that stores the program to perform a nested resolution scrollbar function. (A person of ordinary skill in the art will recognize that the zoom capable scrollbar as described herein can be used with any interface, such as a GUI. Thus, the zoom capable scrollbar could be used in systems from WEBTV, Hand-Held Communication Devices, Wireless Web via digital phones, etc. The use of "desktop computer" herein is by example only and is intended to encompass any GUI that presents information in a window.) The desktop computer 100 of FIG. 1 includes a memory 102 connected to the system bus 104, the keyboard adapter 106, the disk drive 108, the central processor 110, and the mouse adapter 112. The memory 102 of FIG. 1 includes a number of operational buffers that are used in conjunction with the nested resolution scrollbar program of FIG. 5, to carry out the method of the scrollbar. The buffers included in the memory 102 are the maximum length buffer 120, and the minimum granularity unit buffer 122. Additional buffers include the course level position buffer P4,124, the medium level position buffer P3,126, the fine level position buffer P2,128, and the extra fine level position buffer P1,130. Additional buffers in the memory 102 include the coarse level window buffer W4,132, the medium level window buffer W3,134, the fine level window buffer W2,136, and the extra fine level window buffer W1,138. In addition, the absolute output position buffer X,140 is included in the memory 102.

The memory 102 also stores the nested resolution scrollbar program 150, whose details are described below in FIG. 5 which is a flow diagram of the sequence of operational steps for the nested resolution scrollbar. Also included in the memory 102 is the operating system program 114. The program stored in the memory 102 are sequences of executable instructions, which when executed in the central processor 110, carry out the method of the scrollbar.

The linear dimension to be traversed by the nested resolution scrollbar can be in a variety of media:

[A] a geometric dimension measured from coarse to fine granularity such as [1] coarse: being the number of kilometers in a parsec, [2] medium: being the number of centimeters in a kilometer, [3] fine: being the number of microns in a centimeter ([a] along a straight line on a flat plane, [b] along a curved line in a plane such as the circumference of a circle, or [c] along a curved line on a three dimensional surface, such as a segment of a spiral on the surface of a cylinder.)

[B] a dimension in time measured from coarse to fine granularity such as [1] coarse: the number of years in the Jurassic geological period, [2] medium: the number of days in a year, [3] fine: the number of seconds in a day, [4] extra fine: the number of milliseconds in a second.

[C] a dimension in the presentation of a video movie that is two hours long, with the video frame rate of thirty frames per second, the presentation being measured from coarse to fine granularity such as [1] coarse: ten minute segments (30×60×10 frames), [2] medium: one minute segments (30×60 frames). [3] fine: five second segments (30×5 frames), [4] extra fine: individual frames.

Each of these traversed dimensions has two characteristics:

[1] a specific maximum length along the dimension (e.g., a two hour video).

[2] a specific minimum granularity unit (e.g., a frame of video).

Figure 2:
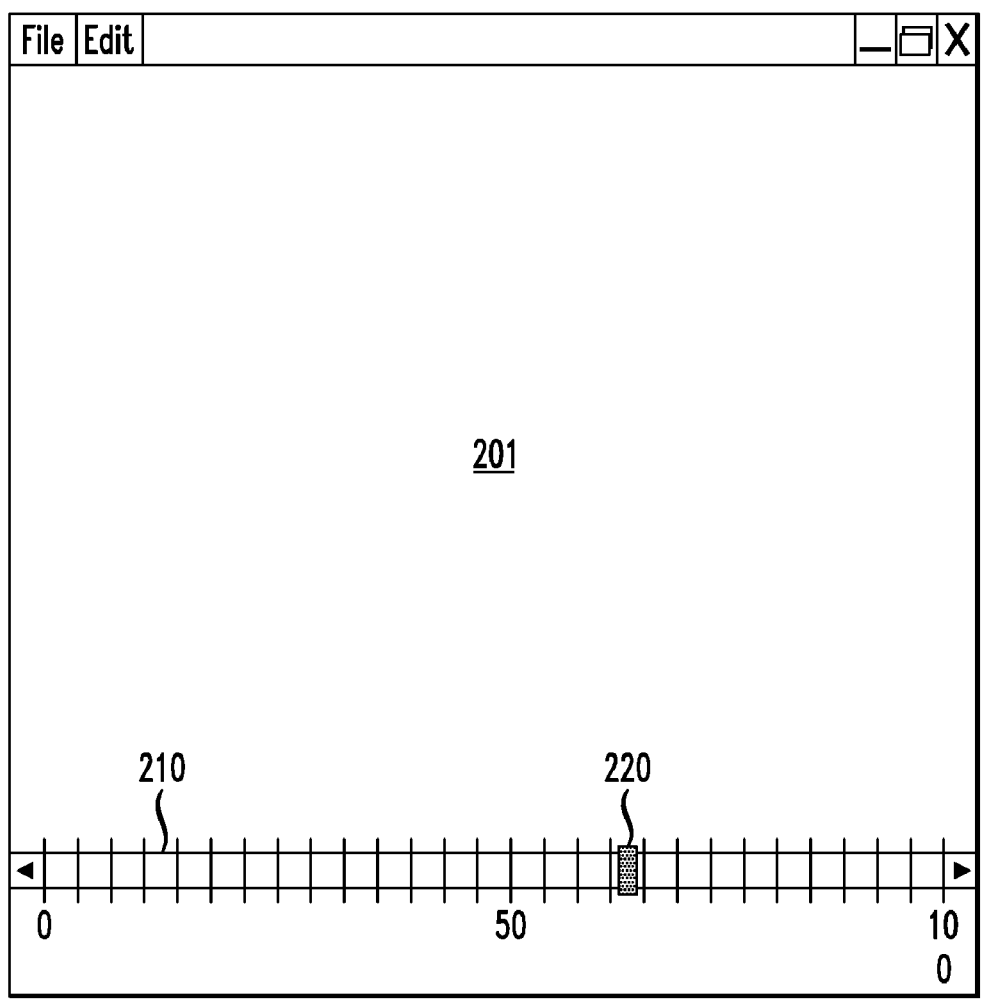
FIG. 2 is a graphical user interface showing a coarse resolution scrollbar.

FIG. 2 is a graphical user interface 201 showing a coarse resolution scrollbar 210. For example, media players for audio or video have a scrollbar with a slider 220 which, when at the left-end of the bar at 0 indicates that the player is playing the beginning of the file, when at the right-end at 100 indicates that the player is playing the end of the file, and when somewhere in between indicates that the player is playing that portion of the data which is somewhere in between as indicated by the position of the slider 220. The user can move the slider 220 to access the data at desired points in the presentation.

Figure 3:
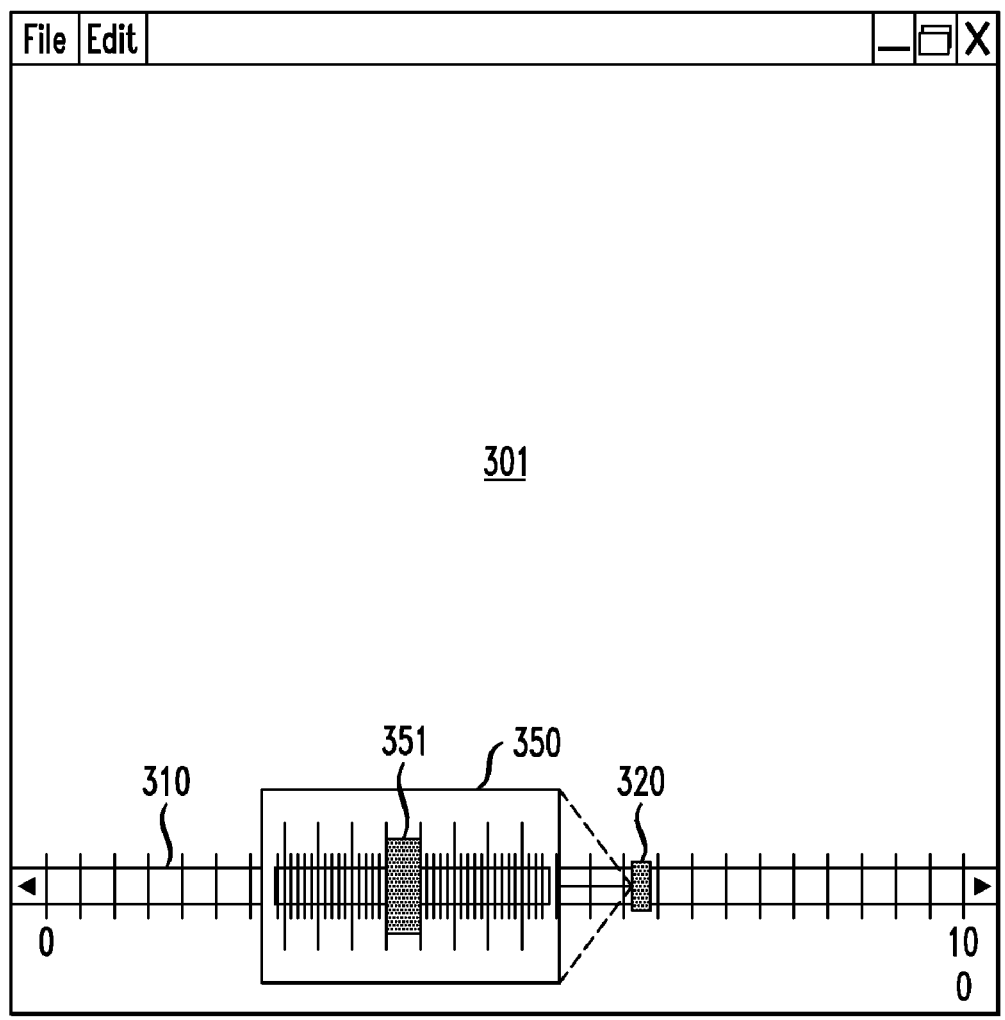
FIG. 3 is a graphical user interface showing a magnified view scrollbar.

FIG. 3 is a graphical user interface 301 showing a magnified view scrollbar 350. Coarse resolution scrollbar 310 includes slider 320, the beginning of a file at 0, and the end of the file at 100. When an user activates the visual menu, such as clicking on the right button on the computer's mouse, the magnified view scrollbar 350 appears on the screen. Though in a preferred embodiment the magnified view scrollbar 350 appears as an overlay on scrollbar 310, one of ordinary skill in the art will recognize that the magnified view scrollbar 350 is capable of a default appearance anywhere on the screen according to user preference. One of ordinary skill in the art will further recognize that the magnified view scrollbar 350 can be moved to any position on the screen after being activated by the user. The magnified view scrollbar 350 in FIG. 3 is shown as twice-original size, or 2× magnification, of the scrollbar 310. Magnified view scrollbar 350 thus allows the user to select a "fine" position in the media operating on the graphical user interface 301. When the magnified view scrollbar 350 is being displayed on the graphical user interface 301, the user can reposition the magnified view slider 351 to select the desired position through fine resolution sequential data control or navigation. Alternatively, the user could operate the computer keyboard to initially select and/or to position the slider 351. The user can preset the magnification of the magnified view scrollbar 350 to default upon opening to a desired degree of magnification.

Figure 4:
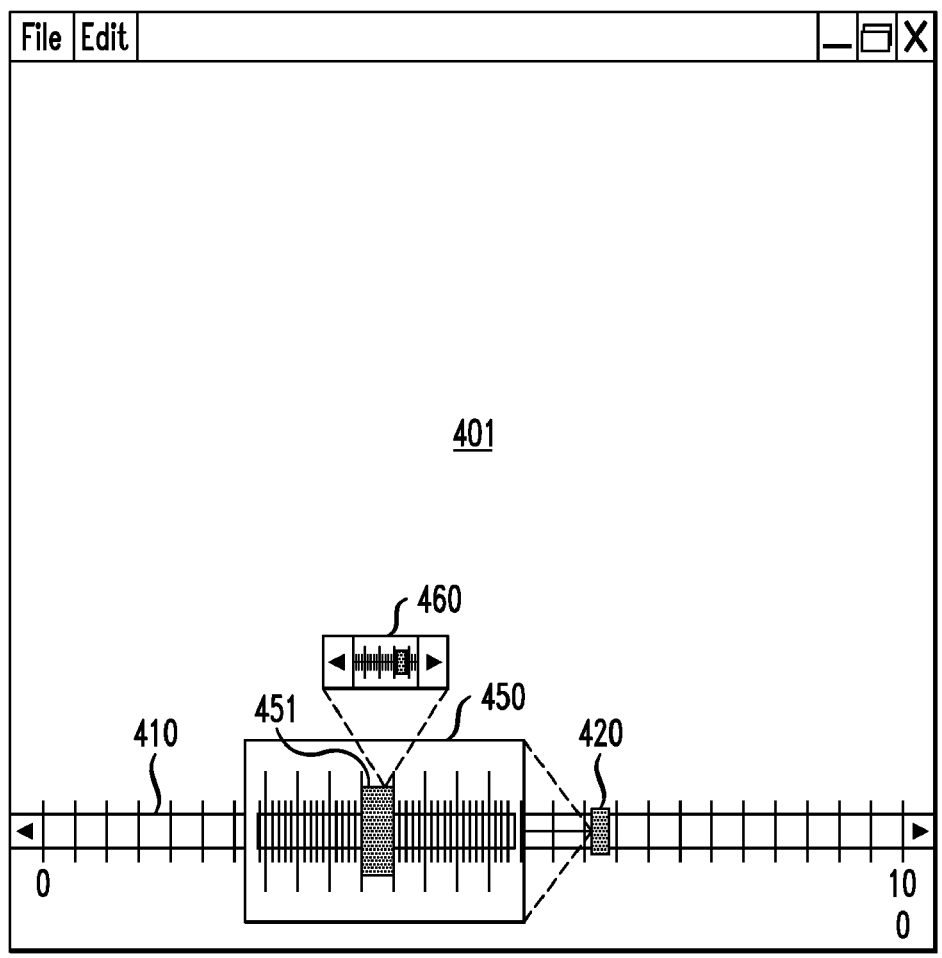
FIG. 4 shows an alternative embodiment of the present disclosure where zooming can continue in a cascading fashion.

FIG. 4 shows an alternative embodiment of the present disclosure where zooming can continue in a cascading fashion. In FIG. 4, a graphical user interface 401 is shown with a magnified view scrollbar 450, a magnified view slider 451, and a coarse resolution scrollbar 410 including a slider 420 with the beginning of a file at 0 and the end of the file at 100. When a user moves the cursor over the slider 420 and activates the visual menu, the magnified view scrollbar 450 appears on the screen as an overlay. In this embodiment, when the magnified view scrollbar 450 is being displayed on the graphical user interface 401, the user can move the cursor over the magnified slider 451, and activate a visual menu 460 which allows the user to choose between zooming up or down to select the desired position. As detailed in FIG. 3 above, the user could operate the computer keyboard to initially select and/or position the slider 451 to the desired position.

Figure 5:
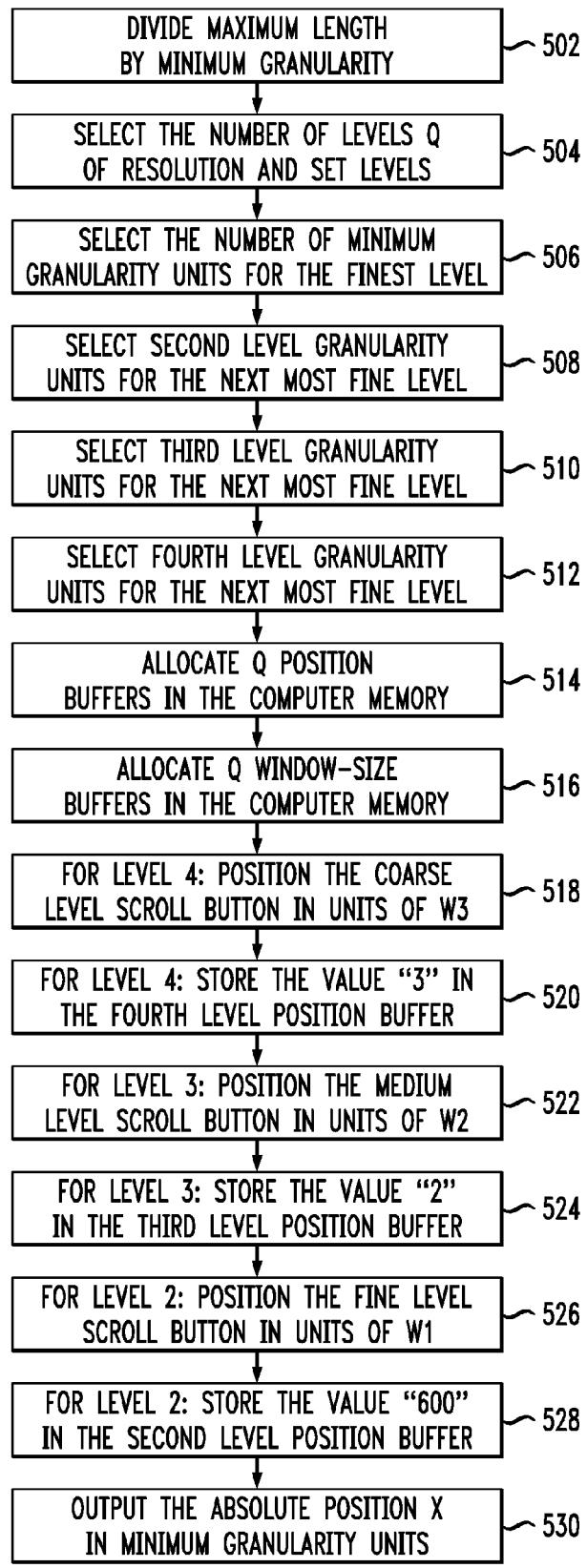
FIG. 5 is a flow diagram of a sequence of operational steps for the nested resolution scrollbar program.

FIG. 5 is a flow diagram of a sequence of operational steps for the nested resolution scrollbar program. The method for a nested resolution scrollbar is shown in FIG. 5 as an example of a two-hour video:

[1] divide the maximum length by the minimum granularity unit to get the total number of minimum granularity units in step 502 (In this example, a two hour video divided by the duration of a frame gives the total number of frames which is 30×60×60×2=216,000 frames).

[2] select the number of levels Q of resolution in step 504 (e.g., four: coarse, medium, fine, and extra fine) and call the levels L1, L2, L3, L4. (Here Q=4 levels).

[3] select the number of minimum granularity units for the finest level in step 506 and refer to the resolution at this level as the resolution number N1 units (In this example, the finest level of granularity is one frame, therefore, N1=1).

[4] select the number of second level granularity units for the next most fine level in step 508 (In this example, fine: five second segments (30×5 frames)), and refer to the resolution at this level as the resolution number N2 units (therefore, N2=150).

[5] select the number of third level granularity units for the next most fine level in step 510 (In this example, medium: one minute segments (30×60 frames)), and refer to the resolution at this level as the resolution number N3 units (therefore, N3=1,800).

[6] select the number of fourth level granularity units for the next most fine level in step 512 (In this example, coarse: ten minute segments (30×60×10 frames)), and refer to the resolution at this level as the resolution number N4 units (therefore, N4=18,000).

[7] allocate Q position buffers in the computer memory in step 514 (In this example, four buffers), one for each resolution: e.g., four positions P1, P2, P3, P4. The value of "P" will be the relative position of the slider within the window of size "W" at resolution level "L".

[8] allocate Q window-size buffers in the computer memory in step 516 (In this example, four buffers: W1, W2, W3, and W4.

W1=1 (one frame)

W2=150 (i.e., the fine window W2 contains 150 of the W1 windows)

W3=12 (i.e., the medium window W3 contains 12 of the W2 windows)

W4=10 (i.e., the coarse window W4 contains 10 of the W3 windows))

[9] For level 4: select the coarse (fourth level L=4) slider S4, measure the position of slider S4 within the coarse window W4 in units of W3. (e.g., in a two-hour video (4), position the cursor at thirty minutes into the movie in step 518 (three units of W3 (ten minutes) in length))

[10] For level 4: store the value "3" in the level L=4 position buffer in step 520 (P4=3). Display slider S4.

[11] For level 3: select the medium (third level L=3) slider S3, measure the position of slider S3 within the medium window W3 in units of W2 in step 522. (e.g., in a ten-minute segment (W3), position the cursor at two minutes into the segment (two units of W2 (one minute) in length))

[12] For level 3: store the value "2" in the level L=3 position buffer in step 524 (P3=2). Display slider S3.

[13] For level 2: select the fine (second level L=2) slider S2, measure the position of slider S2 within the fine window W2 in units of W1 in step 526. (e.g., in a one minute segment (W2), position the cursor at 20 seconds into the segment (600 units of W1 (one frame is ⅟₃₀th of a second) in length))

[14] For level 2: store the value "600" in the level L=2 position buffer in step 528 (P3=600). Display slider S2.

[15] Output the absolute position X of the cursor with respect to the beginning point of the coarse window in step 530, in units of the minimum granularity units, as X=P1×P2×P3×P4.

Figure 6:
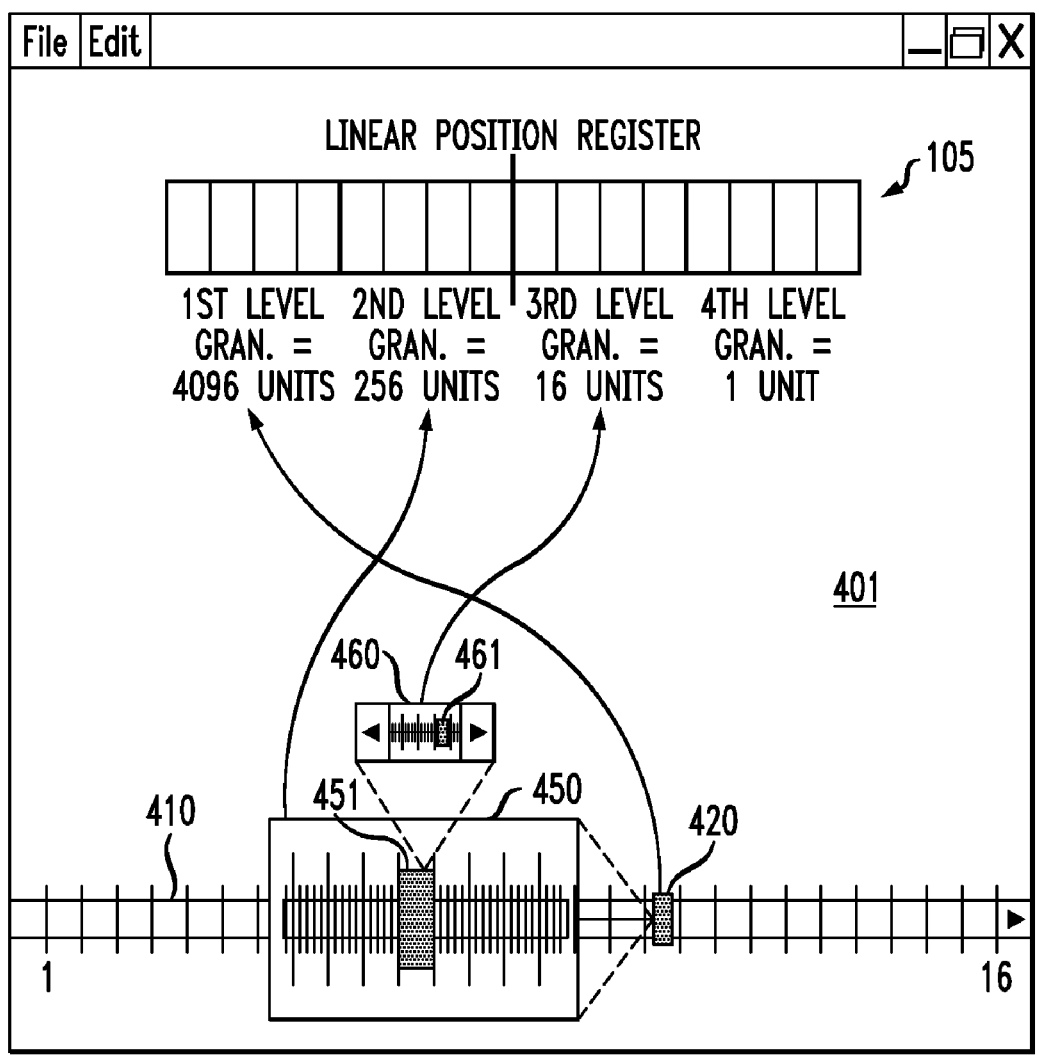
FIG. 6 is a diagram showing the zoom capable scrollbar implemented with a linear position register.

The zoom capable scrollbar can also be implemented as shown in FIG. 6. A linear position register 105 is partitioned in the memory storage device 150 of the computer 100. The linear position register 105 is a two-byte buffer with a low order byte of 8 bits and a high order byte of 8 bits. The 16 bits of the linear position register 105 can span a range of $2^{16}$ units. The linear dimension that is to be traversed by the zoom capable scrollbar can be divided into $2^{16}$ units from its initial position to its final position. The low order byte of the linear position register 105 has a $4^{th}$ level granularity of 1 unit for the low order 4 bits of the low order byte as shown in FIG. 6. In this manner, a value from 0 to 15 corresponds to 1-unit increments along the dimension being traversed by the zoom capable scrollbar. The high order 4 bits of the low order byte of the linear position register 105 correspond to the third level granularity of 16 units. In the third level, each value from 0 to 15 corresponds to traversing 16 units along the dimension being traversed by the zoom capable scrollbar. For the high order byte of 8 bits in the linear position register 105, the low order 4 bits correspond to the second level granularity of 256 units. For every value of from 0 to 15, a distance of 256 units is being traversed along the dimension being traversed by the zoom capable scrollbar. Lastly, the high order 4 bits of the high order byte in the linear position register 105 of FIG. 6 corresponds to a first level granularity of 4,096 units. For every value from 0 to 15, a distance of 4,096 units is being traversed along the dimension being traversed by the zoom capable scrollbar.

When the coarse scrollbar slider 420 is selected in the window displayed in FIG. 6, the first level granularity portion of the linear position register 105 is selected. The distance from the beginning to the end of the dimension being traversed by the zoom capable scrollbar is measured in units of 4,096 units or 16 divisions from beginning to end, for example, from the left side of the screen to the right side of the screen in FIG. 6. When the user selects the second level scrollbar slider 451 in FIG. 6, the scrollbar slider 751 can traverse any one of 16 units within the magnified view scrollbar 450, which corresponds to 256 units for every increment of the slider 451. When the user selects the slider 451, the second level granularity portion of the linear position register 105 is selected and the linear position of the slider 451 within the magnified view scrollbar 450 can take one of 16 values which is buffered in the second level granularity portion of the linear position register 105.

When the user selects the third level scrollbar slider 461 within the visual menu 460 of FIG. 6, the miniature scrollbar slider 461 can take one of 16 positions corresponding to one of 16 values which are buffered in the third granularity portion of the linear position 105. The user can further select a $4^{th}$ level scrollbar slider (not shown) which would select $4^{th}$ level granularity portion of the linear position register 105, to enable traversing one unit along the dimension for every increment of the $4^{th}$ level slider.

Figure 7:
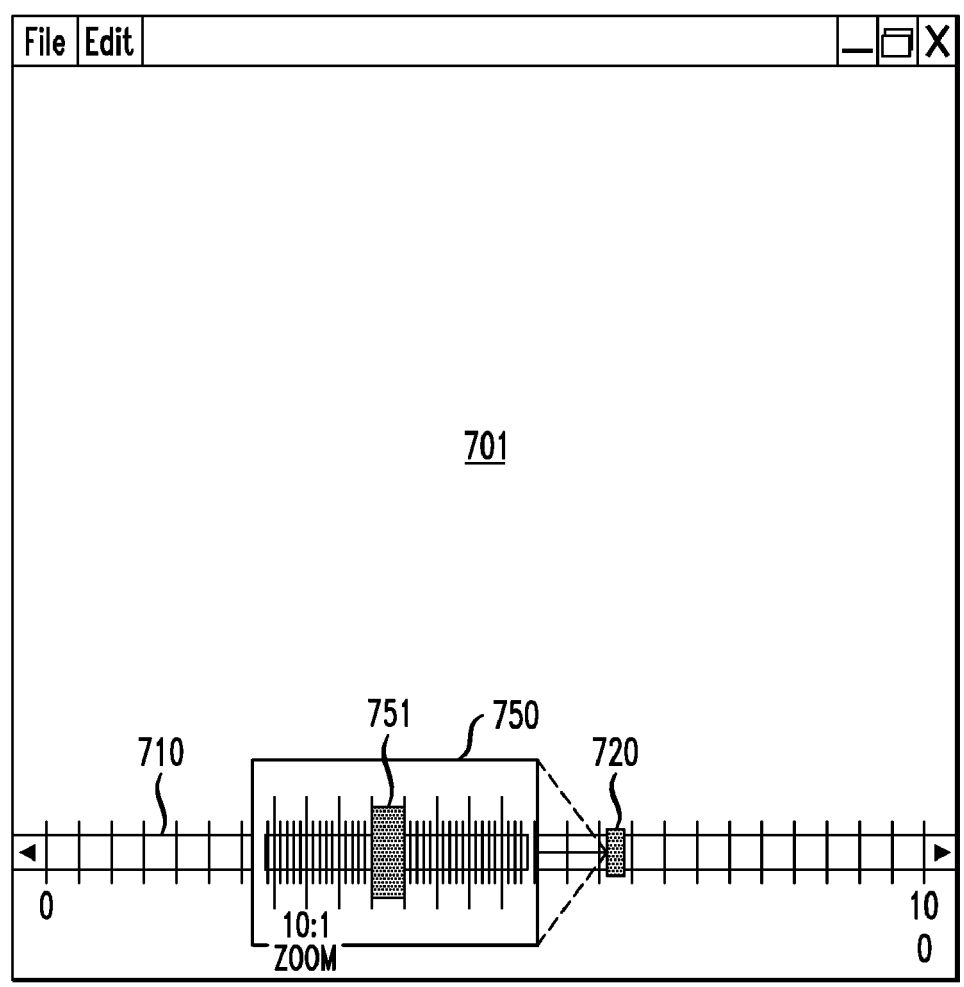
FIG. 7 is an alternate embodiment showing the magnification range of the magnified view scrollbar.

The magnified view scrollbar 750 in FIG. 7 is an alternate embodiment that displays the magnification range as selected by the user (In this example, the ZOOM range is selected as 10:11). Magnified view scrollbar 750 thus allows the user to select a fine position in the media operating on the graphical user interface 701. When the magnified view scrollbar 750 is being displayed on the graphical user interface 701, the user can reposition the magnified view slider 751 to select the desired temporal position through fine resolution sequential data control or navigation. Further, the user can activate further magnification of the magnified view slider 751 by adjusting the magnification to any desired range (For example, the user could adjust the magnification range from 10:1 to 100:1, if desired, for a resolution of 10 times the magnification of the magnified view slider 751). Alternatively, the user could operate the computer keyboard to initially select and/or position the slider 751 to the desired position. The user can set the magnification of the magnified view scrollbar 750 to default upon opening to a desired degree of magnification and then adjust the degree of magnification as desired.

While various embodiments of the present disclosure have been described above, it should be understood that they have been presented by way of example, and not limitation. It will be apparent to persons skilled in the relevant art that various changes in form and detail can be placed therein without departing from the spirit and scope of the disclosure. Thus, the present disclosure should not be limited by any of the above-described example embodiments, but should be defined only in accordance with the following claims and their equivalents.

We claim:

1. An apparatus for providing a nested resolution scrollbar in a graphical user interface, comprising:
   a memory; and
   at least one processor coupled to the memory and operative to:
   display a coarse control scrollbar in a graphical user interface to provide a user with coarse resolution sequential data control;
   display a magnified view scrollbar in the graphical user interface proximate to the coarse control scrollbar, the magnified view scrollbar providing the user with fine resolution sequential data control;
   display a directional menu to provide the user forward or backward sequential scrolling in a cascading fashion;
   select a granularity level in a linear position register in response to selecting a level buffer; and
   buffer a position value in the selected granularity level of the register.

2. An apparatus for providing a nested resolution scrollbar in a graphical user interface, comprising:
   a memory; and
   at least one processor coupled to the memory and operative to:
   divide a maximum length entity by a minimum granularity unit to get a total number of minimum granularity units in the entity;
   select a number of levels of resolution;

select a number of minimum granularity units for each level of resolution;
allocate a position buffer for each level of resolution;
allocate a window-size buffer for each level of resolution;
select a coarse scrollbar slider;
measure the position of the scrollbar slider within the coarse window in units of the subsequent level of resolution; and
store the value of the measured position of the scrollbar slider.

3. An apparatus for providing a nested resolution scrollbar in a graphical user interface, comprising:
a memory; and
at least one processor coupled to the memory and operative to:
divide a maximum length entity by a minimum granularity unit to get a total number of minimum granularity units in the entity;
select a number of levels Q of resolution, as resolution levels L1, L2, L3, L4;
select a number of minimum granularity units for a finest level resolution as a resolution number N1 units;
select a number of second level granularity units for a next most fine level as a resolution number N2 units;
select a number of third level granularity units for a next most fine level as a resolution number N3 units;
select a number of fourth level granularity units for a next most fine level as a resolution number N4;
allocate Q position buffers in the memory, one for each resolution, for positions P1, P2, P3, P4;
allocate Q window-size buffers in the memory W1, W2, W3, W4;
select with a cursor a coarse slider S4;
measure the position of slider S4 within the coarse window W4 in units of W3;
store the value of measured position of S4 in the position buffer P4 and display slider S4;
select with the cursor a medium slider S3;
measure the position of slider S3 within the medium window W3 in units of W2;
store the value of measured position of S3 in the position buffer P3 and display slider S3;
select with the cursor a fine slider S2;
measure the position of slider S2 within the fine window W2 in units of W1;
store the value of measured position of S2 in the position buffer P2 and display slider S2; and
output an absolute position X of the cursor with respect to the beginning point of the coarse window, in units of the minimum granularity units, as $X=P1\times P2\times P3\times P4$.

4. A computer program product for providing a nested resolution scrollbar in a graphical user interface, comprising a computer memory storage device comprising computer readable program code, where the computer readable program code when executed on a computer causes the computer to implement the steps of:
displaying a coarse control scrollbar in a graphical user interface to provide a user with coarse resolution sequential data control;
displaying a magnified view scrollbar in the graphical user interface proximate to the coarse control scrollbar, the magnified view scrollbar providing the user with fine resolution sequential data control;
displaying a directional menu to provide the user forward or backward sequential scrolling in a cascading fashion;
selecting a granularity level in a linear position register in response to selecting a level buffer; and
buffering a position value in the selected granularity level of the register.

5. A computer program product for providing a nested resolution scrollbar in a graphical user interface, comprising a computer memory storage device comprising computer readable program code, where the computer readable program code when executed on a computer causes the computer to implement the steps of:
dividing a maximum length entity by a minimum granularity unit to get a total number of minimum granularity units in the entity;
selecting a number of levels of resolution;
selecting a number of minimum granularity units for each level of resolution;
allocating a position buffer for each level of resolution;
allocating a window-size buffer for each level of resolution;
selecting a coarse scrollbar slider;
measuring the position of the scrollbar slider within the coarse window in units of the subsequent level of resolution; and
storing the value of the measured position of the scrollbar slider.

6. A computer program product for providing a nested resolution scrollbar in a graphical user interface, comprising a computer memory storage device comprising computer readable program code, where the computer readable program code when executed on a computer causes the computer to implement the steps of:
dividing a maximum length entity by a minimum granularity unit to get a total number of minimum granularity units in the entity;
selecting a number of levels Q of resolution, as resolution levels L1, L2, L3, L4;
selecting a number of minimum granularity units for a finest level resolution as a resolution number N1 units;
selecting a number of second level granularity units for a next most fine level as a resolution number N2 units;
selecting a number of third level granularity units for a next most fine level as a resolution number N3 units;
selecting a number of fourth level granularity units for a next most fine level as a resolution number N4;
allocating Q position buffers in the memory, one for each resolution, for positions P1, P2, P3, P4;
allocating Q window-size buffers in the memory W1, W2, W3, W4; selecting with a cursor a coarse slider S4;
measuring the position of slider S4 within the coarse window W4 in units of W3;
storing the value of measured position of S4 in the position buffer P4 and displaying slider S4;
select with the cursor a medium slider S3;
measuring the position of slider S3 within the medium window W3 in units of W2; storing the value of measured position of S3 in the position buffer P3 and displaying slider S3;
selecting with the cursor a fine slider S2; measuring the position of slider S2 within the fine window W2 in units of W1;
storing the value of measured position of S2 in the position buffer P2 and displaying slider S2; and
outputting an absolute position X of the cursor with respect to the beginning point of the coarse window, in units of the minimum granularity units, as $X=P1\times P2\times P3\times P4$.

* * * * *